US006876667B1

(12) United States Patent
Synnestvedt et al.

(10) Patent No.: US 6,876,667 B1
(45) Date of Patent: Apr. 5, 2005

(54) METHOD AND APPARATUS FOR ESTABLISHING CLASS OF SERVICE CONFIGURATION IN A NETWORK DEVICE OF A BROADBAND CABLE NETWORK USING DYNAMIC HOST CONFIGURATION PROTOCOL

(75) Inventors: Erik Synnestvedt, Carlisle, MA (US); Greg Morris, Nashua, NH (US); Richard Woundy, North Reading, MA (US); Timothy Webb, Concord, MA (US); Kenneth Kinnear, Jr., Boxborough, MA (US); Samer Seoud, Kokkedal (DK); Michael Hansen, Greve (DK)

(73) Assignee: Cisco Technology, Inc., San Jose, CA (US)

( * ) Notice: Subject to any disclaimer, the term of this patent is extended or adjusted under 35 U.S.C. 154(b) by 872 days.

(21) Appl. No.: 09/845,779

(22) Filed: Apr. 30, 2001

(51) Int. Cl.[7] .......................... H04J 3/16; H04L 12/28; H04L 12/26

(52) U.S. Cl. ..................... 370/466; 370/352; 370/401; 725/114

(58) Field of Search ................................. 370/352, 466, 370/401, 467, 468, 469, 465; 725/111, 114; 709/221, 230

(56) References Cited

U.S. PATENT DOCUMENTS

| 6,523,696 | B1 | * | 2/2003 | Saito et al. ................. 709/223 |
| 6,553,568 | B1 | * | 4/2003 | Fijolek et al. .............. 725/111 |
| 6,577,642 | B1 | * | 6/2003 | Fijolek et al. .............. 370/465 |
| 2002/0075805 | A1 | * | 6/2002 | Gupta et al. ................ 370/235 |
| 2004/0019876 | A1 | * | 1/2004 | Dravida et al. ............. 717/117 |

OTHER PUBLICATIONS

Michael Patrick, "DHCP Relay Agent Information Option", Mar. 2, 2000, pp. 1–14.
R. Droms, "Dynamic Host Configuration Protocol", Mar. 1997, pp. 1–45.
S. Alexander, et al., "DHCP Options and BOOTP Vendor Extensions", Mar. 1997, pp. 1–34.

\* cited by examiner

*Primary Examiner*—Duc Ho
(74) *Attorney, Agent, or Firm*—Hickman Palermo Truong & Becker LLP

(57) ABSTRACT

A method for establishing class of service configuration in a network device of a broadband cable network using Dynamic Host Configuration Protocol (DHCP) is disclosed. A request to obtain a network address presented using DHCP is received from a network interface unit over the cable network, generally upon boot up of the network interface unit. A DHCP message is received from a registration center, and the message includes a network address and a quality of service code value associated with the network interface unit. Based on the quality of service code value, a quality of service configuration is established in the cable network for the network interface unit. As a result, quality of service information is obtained for each network interface unit in the network, specifically when the network interface unit is activated, and as part of its boot-up sequence. Carrying the quality of service information in a DHCP message enables configuration of the network rapidly and without introducing an additional protocol.

20 Claims, 6 Drawing Sheets

METHOD AND APPARATUS FOR ESTABLISHING CLASS OF SERVICE CONFIGURATION IN A NETWORK DEVICE OF A BROADBAND CABLE NETWORK USING DYNAMIC HOST CONFIGURATION PROTOCOL

FIELD OF INVENTION

The present invention generally relates to provisioning end user interfaces that are used in broadband cable multimedia networks. The invention relates more specifically to a method and apparatus for establishing class of service configuration in a network device of a broadband cable network using Dynamic Host Configuration Protocol.

BACKGROUND OF THE INVENTION

Networks based on coaxial cabling originally deployed for cable television transmission are becoming increasingly popular as a means of delivering broadband network services including Internet connectivity, voice calls, video, and other media. In a broadband cable network, customer premises equipment ("CPE") such as a personal computer or Internet Protocol ("IP") phone is interfaced to the cable network through a network interface unit ("NIU"). An example of an NIU is a cable modem. Logically separate from the NIU in the cable network is a head-end facility that contains routing, switching, and transmission equipment. There may be hundreds or more NIUs coupled through the network to equipment at the head end.

Two standards have emerged as the most popular methods for formatting and communicating media over cable networks: DOCSIS™ and DVB/DAVIC. DOCSIS refers to the Data Over Cable Service Interface Specification developed and owned by CableLabs. DVB/DAVIC refers to the "open" international standards DVB-RCCL (ETSI ETS 300 800) and DAVIC 1.5 for broadband communication over cable and wireless/microwave, which is promoted by the DVB/DAVIC Interoperability Consortium of Soborg, Denmark.

In DVB/DAVIC systems, the quality of service received from the cable network by an NIU is determined by a device at the head-end called an Interactive Network Adapter ("INA"). When an NIU starts operating or boots up, it establishes a logical connection to an INA. However, the DVB/DAVIC standards do not specify how the INA applies the correct class of service to a connection to a particular NIU.

In one past approach, a quality of service profile management information base ("QoS Profile MIB") is defined in storage in the INA. The QoS Profile MIB is allocated a fixed amount of storage in the INA. As NIU's are deployed in the network, information identifying the NIUs that are connected to and served by an INA is added to the NIU MIB table manually, by an administrator working with INA management software. As a result, each INA acquires knowledge about the NIUs that it serves. While this approach is useful for changing the QoS of an NIU connection on demand, it has several disadvantages.

First, a fixed-size table such as the NIU MIB does not assure that all NIU's in the network can be served by the INA. Each NIU that is provisioned takes up INA MIB table space, regardless of whether a user, client computer or other CPE device associated with the NIU is signed-on to the network. When an NIU is permanently removed from the network, an administrator is required to manually remove the corresponding MIB table entry from the INA MIB table. Further, an over-subscribed INA can run out of MIB table entries even when only a fraction of the NIUs are actually connected to the network or in use.

Second, the provisioning process is manual. Any provisioning addition or change that needs to be made is done manually using the INA management software. There is presently no way to automate the process.

Based on the foregoing, there is a clear need for an improved and more efficient way to communicate network quality of service information from cable network head-end equipment to network interface units.

There is also a need for a way to manage the QoS Profile MIB table, or functionally equivalent tables, using a more flexible approach that avoids causing the INA to run out of table entries. For example, there is a need for a method of adding entries to the table or removing entries from the table as NIUs actual enter or leave service in the network.

There is also a need for a more flexible approach that provides automatic addition and deletion of information about NIUs to and from tables such as the QoS Profile MIB table.

SUMMARY OF THE INVENTION

The foregoing needs, and other needs that will become apparent for the following description, are achieved in the present invention, which comprises, in one aspect, a method for establishing class of service configuration in a network device of a broadband cable network using Dynamic Host Configuration Protocol (DHCP). A request to obtain a network address presented using DHCP is received from a network interface unit over the cable network. A DHCP message is received from a registration center, and the message includes a network address and a quality of service code value associated with the network interface unit Based on the quality of service code value, a quality of service configuration is established in the cable network for the network interface unit According to certain features of this aspect, the request and the DHCP message are received at an interactive network adapter or other chassis. The interactive network adapter inserts a DHCP option field into the request, and forwards it to a registration center. The registration center determines a quality of service class that applies to the network interface unit. In one feature, the registration center converts the quality of service class to a quality of service code value and inserts it into a sub-field of the DHCP option field. The registration center returns the modified DHCP message to the interactive network adapter. In response, the interactive network adapter configures itself to provide the quality of service identified by the quality of service code value for the network interface unit.

As a result, quality of service information is configured for each network interface unit in the network, specifically when the network interface unit is activated, and as part of its boot-up sequence. Carrying the quality of service information in a DHCP message enables configuration of the network rapidly and without introducing an additional protocol. Further, table entries in the interactive network adapter that refer to network interface units may be added and deleted dynamically as network interface units are activated or deactivated.

These approaches are usable with NIUs that conform to either DOCSIS or DVB/DAVIC, and may be implemented using interactive network adapters, universal broadband routers, and other network devices.

Other aspects and features will become apparent from the following description. For example, in other aspects, the invention encompasses a computer apparatus and a computer readable medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for establishing class of service configuration in a network device of a broadband cable network using Dynamic Host Configuration Protocol is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The description is presented according to the following general outline:

A. CABLE NETWORK STRUCTURAL OVERVIEW AND OPERATIONAL CONTEXT
B. FUNCTIONAL OVERVIEW
 1. HIGH LEVEL OVERVIEW
 2. METHOD FOR ESTABLISHING QUALITY OF SERVICE IN CABLE NETWORK CONTEXT
 3. MODEM TABLE PRUNING
 4. AUTOMATIC MAC LAYER PROVISIONING
 5. DHCP FAILOVER SUPPORT
 6. PARTICULAR FEATURES AND CHARACTERISTICS
C. HARDWARE OVERVIEW
D. EXTENSIONS AND ALTERNATIVES

A. Cable Network Structural Overview and Operational Context

Figure 1:
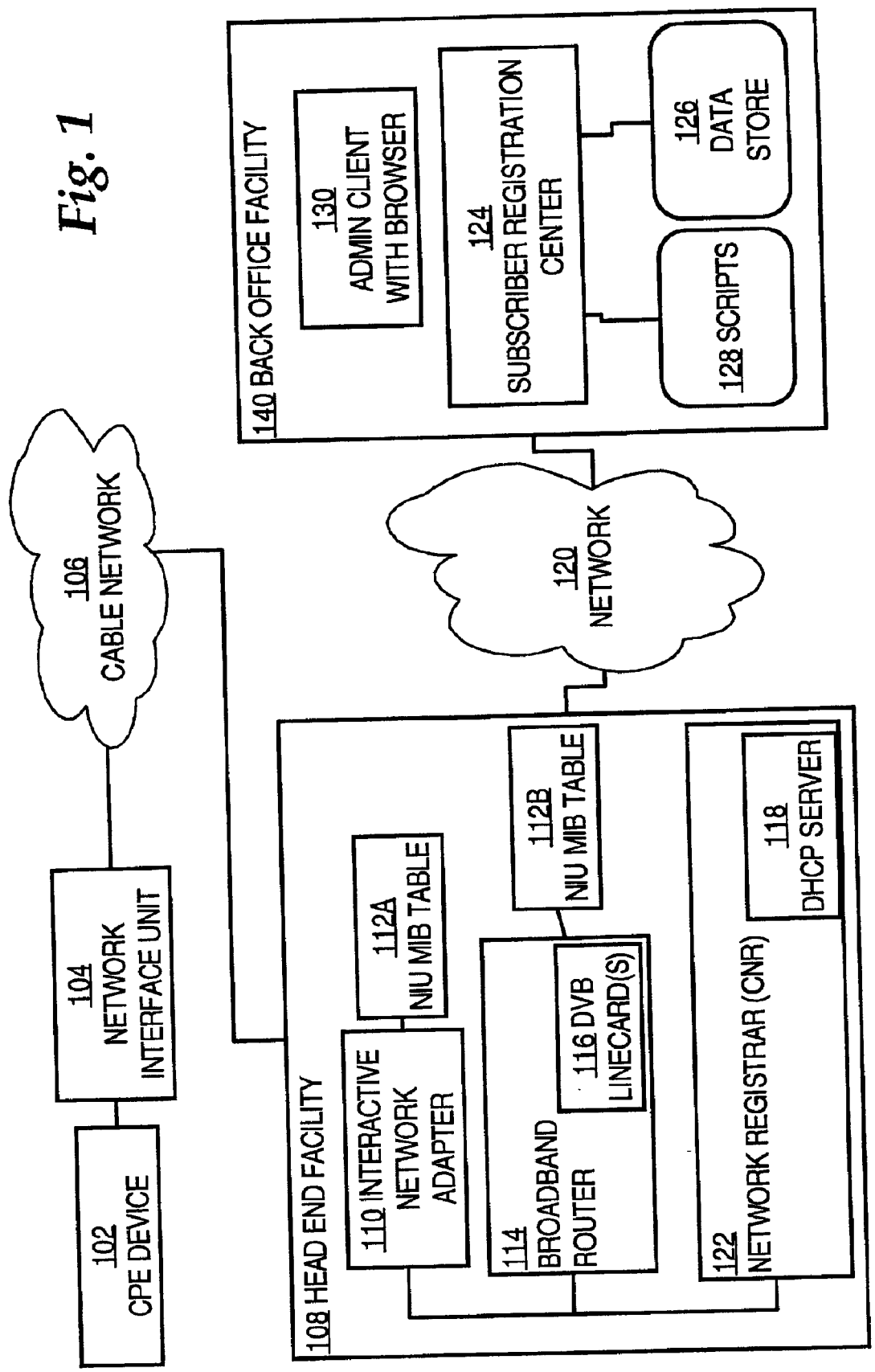
FIG. 1 is a block diagram showing a simplified arrangement of functional elements in a cable network system.

FIG. 1 is a block diagram showing a simplified arrangement of functional elements in a hypothetical broadband cable network.

A CPE device 102 is communicatively coupled to a network interface unit 104, which is communicatively coupled to a cable network 106. An example of CPE device 102 is a personal computer, workstation, IP phone, etc. An example of a network interface unit 104 is a cable modem such as the Cisco CVA122 Cable Voice Adapter from Cisco Systems, Inc. Cable network 106 refers to a broadband multi-services network of the type that has been constructed in part using the wiring, equipment and facilities of commercial networks originally created for transmission of cable television programing.

FIG. 1 is simplified for clarity. Thus, although only one CPE device 102 and one network interface unit 104 are illustrated, in a practical system there may be an unlimited number of such devices and units.

A head-end facility 108 ("head end") is communicatively coupled to cable network 106 at a position logically separate from network interface unit 104. The head end is an office or other facility that contains equipment for switching, routing, and other processing of cable network traffic. The head end may also have satellite uplink equipment for receiving remotely generated data and programming. The head end also has equipment that is communicatively coupled to a public network, such as the global packet-switched internetworks collectively known as the Internet.

Head-end facility 108 hosts one or more computer hardware devices that manage traffic originating in the cable network 106. Such devices may vary in type, configuration or operational software according to whether the devices support the DOCSIS specification or the DVB/DAVIC standards. For example, the head-end facility may have one or more interactive network adapters that operate under the DOCSIS specification. To illustrate this alternative, an interactive network adapter 110 is shown in head-end facility 108 in FIG. 1. The interactive network adapter 110 manages a network interface unit management information base ("NIU MIB") table 112A.

The head-end facility also may have devices that operate under the DVB/DAVIC standards. For example, a broadband router 114 is provided. The broadband router 114 comprises a chassis that can accommodate one or more line cards that can communicate using DVB, as illustrated by DVB line cards 116. Each of the line cards 116 in the broadband router 114 manages and interacts with its own NIU MIB table 112B. Commercial products that may be used as broadband router 114 include the Cisco uBR 7200 Series Universal Broadband Routers.

Head-end facility 108 also includes a network registrar 122 that is communicatively coupled to interactive network adapter 110 and to broadband router 114. A specific example of network registrar 122 is Cisco Network Registrar. The network registrar includes a DHCP server 118 that can generate dynamic network addresses, such as Internet Protocol (IP) addresses, for devices in the cable network. DHCP server 118 communicates with other elements of the system using messages that are formatted according to DHCP. Further information about DHCP and its applications is available at the Web site of the DHCP organization, dhcp.org.

In one embodiment, network registrar 122 comprises a DHCP server, a domain name service (DNS) server, and a trivial file transfer protocol. (TFTP) server. Network registrar 122 further comprises an agent server that monitors the other servers, a command line interface for controlling the servers, and a graphical user interface that enables a user with a Web browser to control the servers. While such a configuration is convenient, it is not required.

A back-office facility 140 is communicatively coupled to data network 120, which is communicatively coupled to the head-end facility 108. In this context, data network 120 refers to one or more packet-switched local area networks, wide area networks, or internetworks. The term "data network" is used to differentiate network 120 from cable network 106; however, the information carried by data network 120 may represent a variety of media including streaming video, audio, voice calls, Web traffic, etc. Elements in the back-office facility 140 can communicate with elements in the head-end facility 108 by sending appropriate messages over data network 120.

Back-office facility 140 includes a subscriber registration center 124 and one or more administrative clients 130. The subscriber registration center 124 comprises one or more software elements that provide administrative functions for adding, deleting, and managing subscribers to the cable network. In this context, "subscriber" refers to an end user of the cable network, such as an individual who owns or operates CPE device 102. Administrative client 130 in FIG. 1 represents a computer or workstation of an administrative user who interacts with the subscriber registration center 124 in order to carry out provisioning and management functions. In one specific embodiment, administrative client 130 executes a browser program and interacts with subscriber registration center 124 using electronic documents, such as HTML pages, that are generated by the subscriber registration center and communicated over network 120 to the browser.

Subscriber registration center 124 interacts with a data store 126 that holds, among other data, information about quality of service classes applicable to network interface units that participate in the cable network. Data store 126 may be implemented as a directory, relational database, etc. In one specific embodiment, data store 126 is an LDAP directory, such as Microsoft Active Directory.

Subscriber registration center 124 also can access and execute one or more user-defined scripts 128 for carrying out provisioning, administrative or management functions as defined by administrative users of the back-office facility. Scripts 128 provide a way for an owner or operator of the back-office facility 140 to customize the operation of subscriber registration center 124 according to specific business practices.

A commercial example of subscriber registration center 124 is Cisco Subscriber Registration Center, from Cisco Systems, Inc.

The elements of back-office facility 140 may be co-located with the elements of head-end facility 108 in a single combined facility. Use of separate facilities is a convention that is generally followed by leaders in the industry, but it is not required. Further, the elements of FIG. 1 and the foregoing description present one example context in which to practice the invention that is described herein. However, the invention is not limited to this example context, and may be practiced in any other network, system, architecture or other arrangement that has structural elements capable of carrying out the functions that are described herein.

B. Functional Overview

1. High Level Overview

Figure 2:
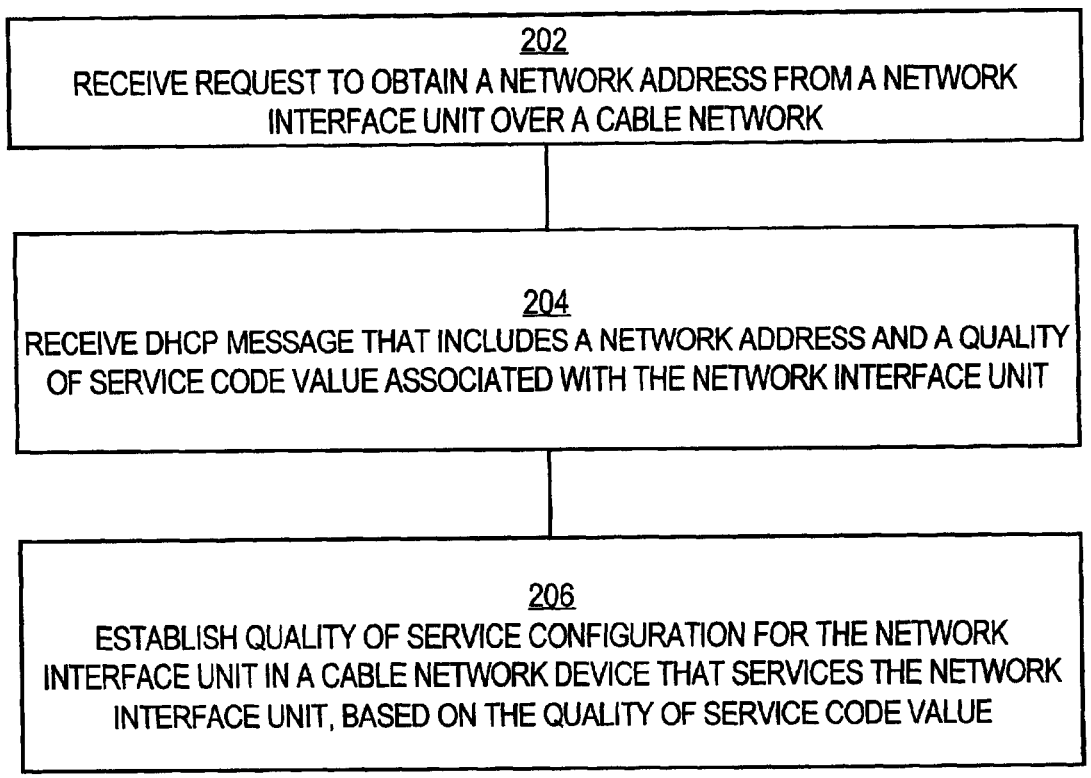
FIG. 2 is a flowchart that illustrates a high level overview of one embodiment of a method for establishing class of service configuration in a network device of a broadband cable network using Dynamic Host Configuration Protocol.

FIG. 2 is a flowchart that illustrates a high level overview of one embodiment of a method for establishing class of service configuration in a network device of a broadband cable network using Dynamic Host Configuration Protocol.

In block 202, a request to obtain a network address is received from a network interface unit over a cable network. In one specific embodiment, block 202 involves receiving a DHCP Discover request for an IP address from a network interface unit at an interactive network adapter.

In block 204, a DCHP message is received that includes a network address and a quality of service code value associated with the network interface unit in one specific embodiment, block 204 involves receiving a DHCP Offer message at the interactive network adapter from a subscriber registration center. The DHCP message includes a dynamic IP address that has been allocated by a DHCP server for the network interface unit, and a quality of service code value that is encapsulated in a field of the DHCP message. The quality of service code value is determined for the network interface unit by the subscriber registration center.

In block 206, a quality of service configuration is established for the network interface unit in a cable network device that services the network interface unit, based on the quality of service code value. In one specific embodiment, block 206 involves configuring the interactive network adapter so that all traffic served to the network interface unit is treated with a quality of service associated with the quality of service code value. For example, a QoS Profile MIB stored in the interactive network adapter is updated to add an entry for the network interface unit, and to store configuration values appropriate for the kind of packet processing indicated for the network interface unit by the quality of service code value.

2. Method for Establishing Quality of Service in Cable Network Context

Figure 3A:
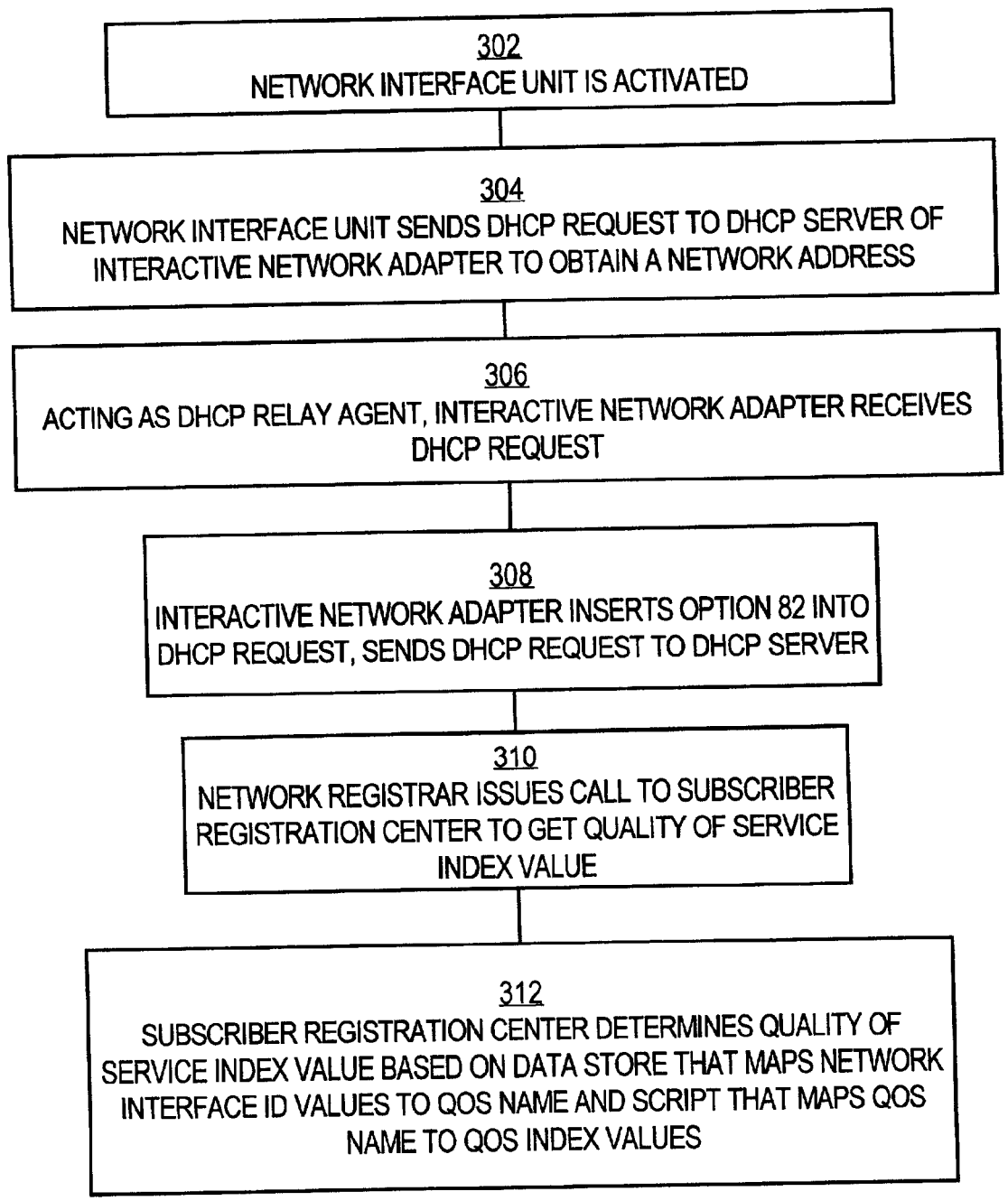
FIG. 3A is a flowchart of a portion of another embodiment of a method for establishing quality of service for network interface units in a cable network.

FIG. 3A is a flowchart of a portion of another embodiment of a method for establishing class of service configuration in a network device of a broadband cable network using Dynamic Host Configuration Protocol. For purposes of illustrating a clear example, the method of FIG. 3A is described herein with reference to the example network context of FIG. 1. However, the method of FIG. 3A is not limited to that context.

In block 302, a network interface unit is activated. Block 302 represents, for example, rebooting a cable modem, initially applying power to it, etc. In general, this is done by an end user who is associated with CPE device 102 o network interface unit 104.

In a network that uses dynamic address assignment, as part of the boot-up sequence, the network interface unit 104 needs to obtain a specific network address for itself, e.g., an IP address. For example, DVB/DAVIC network interface units usually perform a DHCP or BOOTP message exchange to obtain an IP address, before they permit subscriber access across the network. Accordingly, in block 304, the network interface unit sends a DHCP request to obtain an IP address. The request may comprise one or more DHCP Discover packets.

In one embodiment, an interactive network adapter at the head-end facility is assigned to manage the network interface unit, and acts as a forwarding agent for DHCP protocol messages. For example, a DVB/DAVIC interactive network adapter typically acts as a relay agent for DHCP/BOOTP message exchanges with network interface units, converting a DHCP/BOOTP broadcast message into one or more unicast messages to be sent to DHCP/BOOTP servers. Therefore, the network interface unit directs its DHCP request to the interactive network adapter, which receives the DHCP request as indicated by block 306.

In block 308, the interactive network adapter insets an option field into the DHCP request, and then forwards the DHCP request to obtain a network address.

In one specific embodiment, the interactive network adapter receives one or more DHCP Discover packets from the network interface unit, inserts the DOCSIS Option 82 field into the DHCP request, and forwards it to a network registrar that manages a DHCP server. General information regarding Option 82 maybe found in a draft document of the Internet Engineering Task Force (ietf.org) entitled "draft-ietf-dhc-agent-options-09.txt."

As further described herein, the Option 82 field includes a sub-field that can carry a code value associated with a quality of service profile for use with the network interface unit. The inserted information for Option 82 includes the MAC address of the modem in the Remote ID field, and a value in the Circuit ID field that uniquely identifies the interactive network adapter. The DHCP server and subscriber registration center are configured to distinguish a DHCP request received from a device connected to a DOCSIS line card from one connected to a DVB/DAVIC line card in the interactive network adapter. This information is necessary for the subscriber registration center to determine what sort of provisioning action to take. According to this embodiment, the Option 82 Circuit ID field is enhanced to include a value that identifies the type of provisioning to do for devices coming through the interface.

Specifically, the Option 82 field comprises a Circuit ID sub-field and a Remote ID sub-field. The Circuit ID sub-field of the Option 82 field in a DHCP Discover packet comprises a SubOption identifier, a Length value, and an SNMP Interface Index value. The SubOption identifier value is a one-byte value that identifies the sub-option as the Circuit ID sub-option. The Length value is a numeric value that identifies the length in bytes of the sub-option. The SNMP Interface Index value is a 4-byte value.

Bits 0-15 give the interface index of the downstream interface. Bits 16-23 give the upstream channel ID. Bits 29-30 indicate the type of provisioning required. A value of 00 indicates that DOCSIS provisioning required; 01 indicates that DVB provisioning is required; 10 indicates that Fixed wireless provisioning is required; and 11 indicates that other provisioning is required. Bit 31 indicates whether the device is a cable modem or host, where a value of "1" indicates a Cable Modem device and a value of "0" indicates a CPE device that is logically behind the cable modem. If the value of bit 31 is "0", then the modem MAC address is provided shown in; suboption2, the Remote ID sub-option.

An additional MIB attribute, called the Disabled Modem MIB entry herein, is added to the QoS MIB table (also called "modem table") to allow each modem entry to be permanent or temporary. This allows the subscriber registration center and the processes herein to provision temporary modem table entries. Temporary entries are ones that are pruned as described in the next section. Permanent entries are ones that should not be pruned by the mechanism below. The default value of the MIB attribute is false (0), for modem entries created via the option 82 processing described herein. Entries created using SNMP have a default value of true (1).

Figure 4:
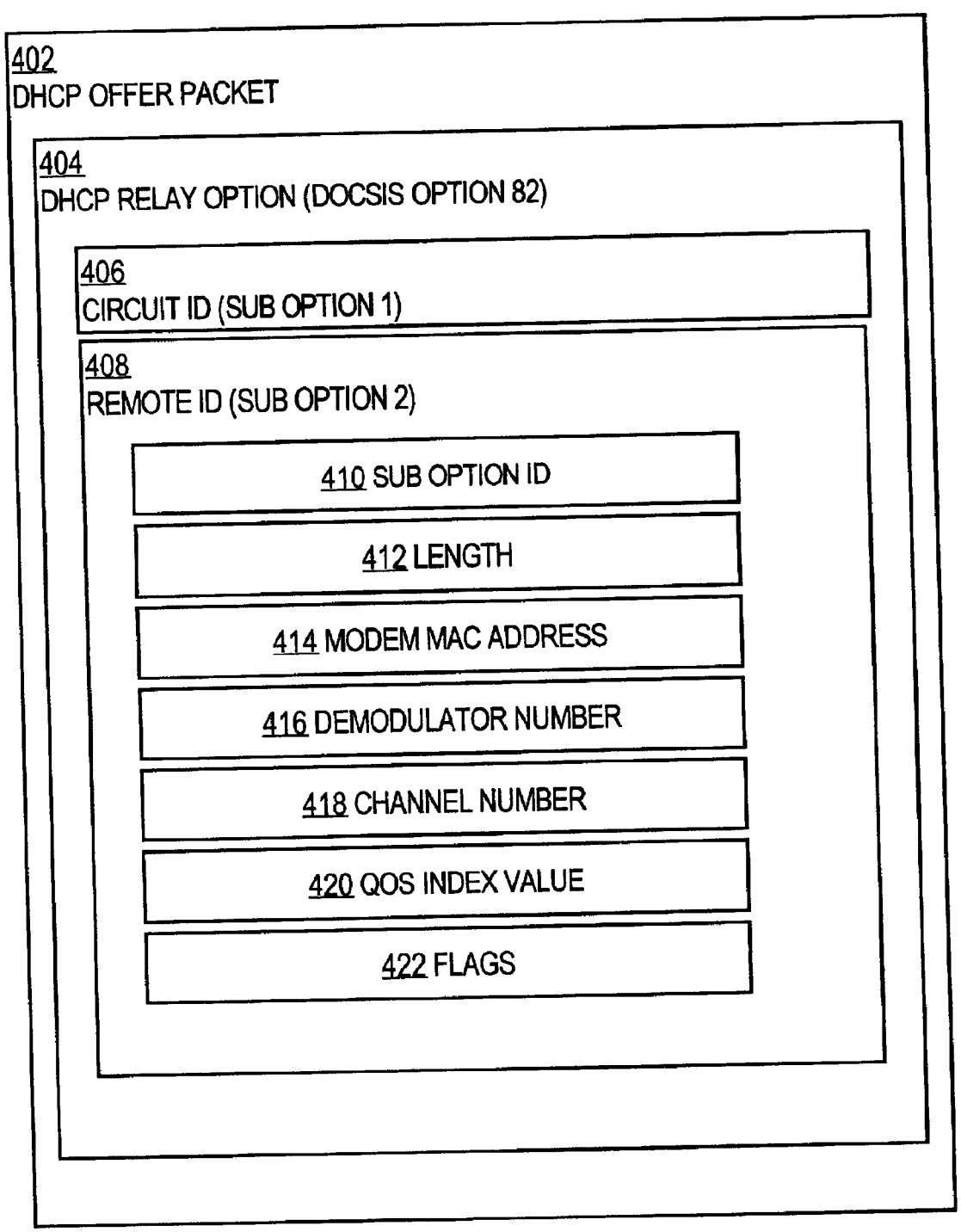
FIG. 4 is a simplified block diagram of a DHCP offer packet that carries a quality of service code value.

As an example of how the quality of service index value can be carried in a DHCP message, FIG. 4 is now described. FIG. 4 is a simplified block diagram of a DHCP offer packet that carries a quality of service code value. DCHP offer packet 402 comprises various data values, including DHCP Relay Option (DOCSIS Option 82) field 404. Option 82 is normally used to carry relay agent information. Within the Option 82 field are a Circuit ID sub-option field 406 and a Remote ID sub-option field 408.

The Remote ID sub-option field 408 comprises a sub-option id value 410, a length value 412, a modem MAC address value 414, a demodulator number value 416, a channel number value 418, a quality of service index value 420, and flags 422. The sub-option id value 410 identifies the sub-option field as the Remote ID sub-option. The length value 412 specifies the length in bytes of the Remote ID sub-option field, e.g., 10 bytes. The modem MAC address value 414 specifies a MAC address for a cable modem or other network interface unit. The demodulator number value 416 indicates which demodulator is used by the network interface unit. The channel number value 418 identifies a communication channel assigned to the network interface unit. Flags 422 carry bits that control enabling and disabling a modem in the MIB table. When bit 0 has a value of 0, the modem is enabled by setting a Disabled Modem MIB entry to false (0). When bit 0 has a value of 1, the modem is disabled by setting the value of the MIB entry to true (1).

Quality of service index value 420 comprises a one-byte value that uniquely identifies one of a plurality of quality of service profiles that are defined in the system for use by the interactive network adapter. Each quality of service profile comprises one or more specific packet processing configuration values which, when applied to packets communicated among a particular network interface unit and the interactive network adapter, collectively implement a particular quality of service class for that network interface unit. For example, a quality of service profile may comprise a maximum burst value.

In block 310, the network registrar issues a call to the subscriber registration center to obtain the quality of service code value. In response, in block 312, the subscriber registration center determines the quality of service index value.

In one specific embodiment, an indirect mapping approach is used to obtain the quality of service index value in block 312. The subscriber registration center uses an identifier value that is uniquely associated with the network interface unit as a directory object name or key to retrieve a quality of service label from a data store. The quality of service label is an abstract name for a particular class of quality of service, e.g., "Gold," "superior," etc. The subscriber registration center then executes a script that maps the quality of service label to a specific quality of service index value. The indirect mapping approach described herein is not required. In an alternative embodiment, the quality of service index value is directly obtained from the data store.

Figure 3B:
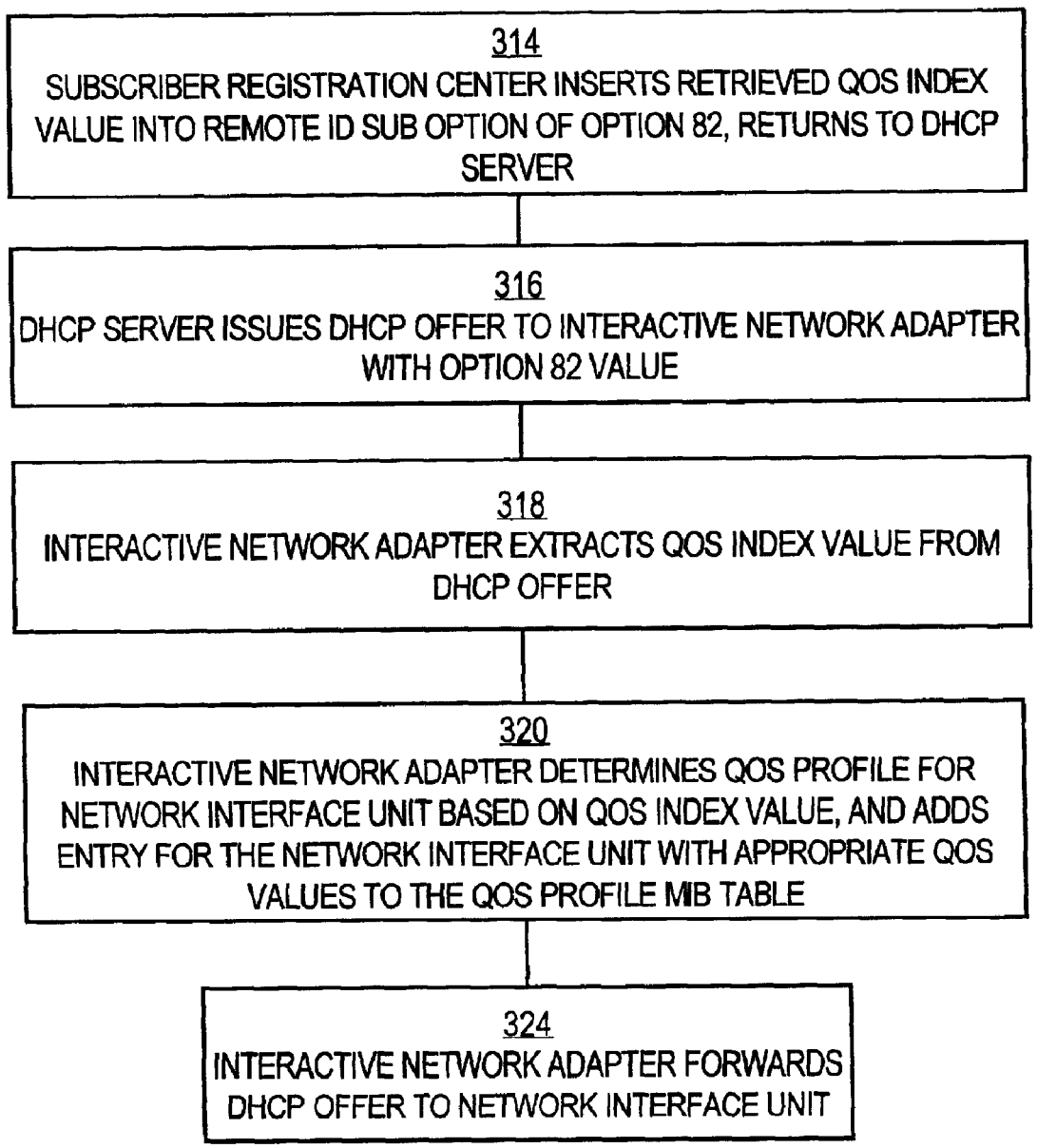
FIG. 3B is a flowchart of further steps in the method of FIG. 3A.

FIG. 3B is a flowchart of further steps in the method of FIG. 3A. Referring now to block 314 of FIG. 3B, the subscriber registration center inserts the retrieved quality of service index value into a subfield of the option field of the DHCP message. After the quality of service index value is inserted into the Remote ID sub-option of the DHCP message, the interactive network adapter returns the DHCP message to the DHCP server. In the specific context of FIG. 1, the DHCP message is passed to a DHCP server of the network registrar. In block 316, the DHCP server issues a DHCP offer message to the interactive network adapter that contains a valid network address for use by the network interface unit, and that carries the quality of service index value in the Option 82 subfield.

In response, the interactive network adapter detects the presence of the Option 82 field in the DHCP message. This causes the interactive network adapter to extract a quality of service index value from the DHCP offer message, as shown in block 318. In block 320, the interactive network adapter determines a quality of service profile based on the quality of service index value. For example, block 320 may involve carrying out a table look-up in local storage. The interactive network adapter then adds an entry for the network interface unit, with appropriate quality of service values from the quality of service profile, to the QoS Profile MIB table that it manages. Block 320 also optionally may involve carrying out any other steps necessary to configure the interactive network adapter or other elements of the head-end facility 108 to deliver the quality of service, indicated by the quality of service index value, to the network interface unit.

In one specific embodiment of blocks 316-320, a portion of software executed by the interactive network adapter that is responsible to process DHCP Offer Packets removes Option 82 from incoming DHCP Offer packets. If the value of the Circuit ID field contained in Option 82 is different from the identifier previously inserted by the INA, then the INA uses the contents of the Circuit ID field as the profile number for the modem. The INA software then modifies its modem table to reflect the modem MAC address and the profile number, and automatically triggers the QoS policy enforcement for that modem. The INA then forwards the DHCP Offer packet back to the modem. If the value of the Circuit ID field contained in Option 82 is the same as the value previously inserted by the INA, then INA updates its modem table with the modem MAC address and the default profile number.

In block 324, the interactive network adapter forwards the DHCP offer message to the network interface unit. This provides the network interface unit with a network address for use in later packet communications, which the network interface unit originally requested in block 302.

In an embodiment that uses a universal broadband router for communication, processing is similar. The Option 82 processing described herein is selectable using the INA MIB. In one specific embodiment, in order to provision the DVB/DAVIC device the subscriber registration center modifies the Remote ID portion of DHCP Option 82 in the DHCP server before the Offer packet is sent back down to the relay agent. Upon receiving the DHCP Offer, the broadband router 114 checks the contents of the Remote ID field for the provisioning information that is specified below.

The broadband router 114 then updates the appropriate interface, as specified in the Circuit ID field SNMP index, with the information found in the Remote ID field. Once this programming is complete, the broadband router 114 forwards the DHCP Offer back to the modem. If the content of the Remote ID field contained in Option 82 does not contain provisioning information, the broadband router 114 simply strips the Option 82 and forwards the DHCP Offer on to the client.

The Option 82 format for the DHCP Offer packet comprises the two Circuit ID and Remote ID sub options having the sub-field values as stated above.

3. Modem Table Pruning

Periodically, each INA removes entries from its modem table for modems that no longer have MAC layer connectivity to the INA. In one embodiment, the subscriber registration center is constantly provisioning new devices as they are connected to the network, and the broadband router 114 is provisioning these devices by adding them to the modem table associated with the line cards. To prevent the modem table from filling up with old provisioning information, firmware executed in the line card periodically removes modem table entries for modems that no longer have MAC layer connectivity.

In one embodiment, in carrying out automatic modem table pruning, the modem table persists across modem reboots. This is provided because a QoS change is not made effective until a modem is rebooted. To support this function, the interactive network adapter and the broadband router 114 prune temporary modem table entries only when they are reset 4. Automatic MAC Layer Provisioning According to still another embodiment, automatic re-provisioning occurs with no modem reboot when the modem table is modified by SNMP. This process provides a useful response for situations in which a user is using a software element that manipulates the modem table but that does not notify the subscriber resource center.

5. DHCP Failover Support

According to an embodiment, the INA can be configured with multiple DHCP servers. Thus, the INA can unicast DHCP broadcast packets from modems to more than one DHCP server at a time. This capability enables the INA to communicate with a different DHCP server when a fail over occurs.

6. Particular Features and Characteristics

Accordingly, a method has been described for configuring an interactive network adapter with a particular quality of service appropriate for a specific network interface unit as part of the boot-up process in which the network interface unit obtains a network address by DHCP protocol messages. Unlike prior approaches, the DHCP protocol is used to communicate quality of service information from the DHCP server to the DHCP relay agent, e.g., a DVB/DAVIC interactive network adapter. The approach does not require any change in the structure or function of the network interface unit.

Using the foregoing approach, the NIU MIB table is made dynamic, because the interactive network adapter automatically adds an entry to the NIU when the NIU signs on, and removes an NIU entry when the NIU signs off. As a result, the restrictions imposed by use of a fixed size table for the NIU MIB of prior approaches are overcome. Deploying replacement interactive network adapter hardware is made easier, because the NIU MIB table entries are not required to reside in persistent storage.

The approach herein is more scalable than prior approaches, because it takes advantage of the existing DHCP traffic flow. Because the interactive network adapter acts as relay agent, it is required to process DHCP replies from the DHCP server. Thus, in the present approach, little additional work is required of the interactive network adapter, and is essentially focused on extracting the quality of service value from Option 82 in the DHCP message.

In contrast, a possible alternative approach of communicating the quality of service value in an SNMP Set message would involve more overhead. Nevertheless, in one alternative approach, the general approach described herein is combined with use of SNMP. In this alternative approach, the interactive network adapter determines the quality of service of a rebooting network interface unit via DHCP, and the interactive network adapter determines the modified quality of service of a connected network interface unit via an SNMP Set operation, without a reboot.

The solution described herein leverages the fact that DVB/DAVIC network interface units usually perform a DHCP or BOOTP message exchange to obtain an IP address, before they permit subscriber access across the network. Further, the approach takes advantage of the fact that a DVB/DAVIC interactive network adapter typically acts as a relay agent for DHCP/BOOTP message exchanges with network interface units, converting a DHCP/BOOTP broadcast message into one or more unicast messages to be sent to DHCP/BOOTP servers.

The solution described herein also offers better reliability than other approaches because it takes advantage of the fail over capability of DHCP. In this context, the fail over capability of DHCP refers to the fact that DHCP defines messages that enable a secondary DHCP server can take over for a failed primary DHCP server. In particular, since the network interface unit will retry a DHCP/BOOTP operation until it obtains an IP address, the interactive network adapter is guaranteed eventually to obtain the quality of service profile of any rebooting network interface unit.

C. Hardware Overview

Figure 5:
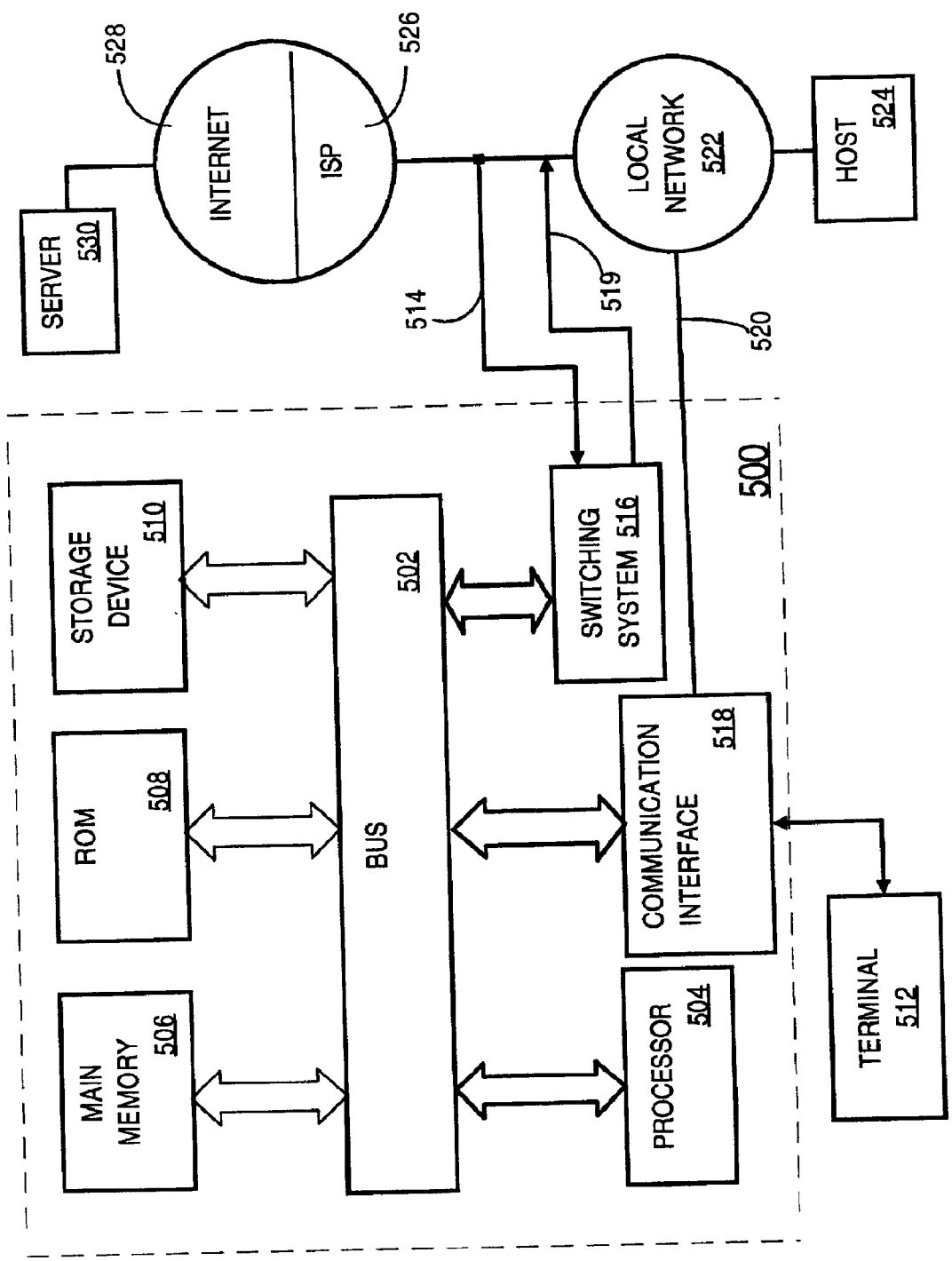
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to predetermined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for provisioning class of service to cable network interface units using Dynamic Host Configuration Protocol. According to one embodiment of the invention, provisioning class of service to cable network interface units using Dynamic Host Configuration Protocol is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for provisioning class of service to cable network interface units using Dynamic Host Configuration Protocol as described herein.

The received code may be executed by processor 504 as it is received, and/or stored in storage device 510, or other non-volatile storage for later execution. In this manner, computer system 500 may obtain application code in the form of a carrier wave.

D. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of establishing a quality of service configuration in a network device that participates in a broadband cable network, the method comprising the computer-implemented steps of:

receiving a request to obtain a network address from a broadband cable network interface unit over the cable network;

receiving a Dynamic Host Configuration Protocol (DHCP) message that includes the network address and a quality of service code value within an option field of the message, wherein the quality of service code value is associated with a quality of service that is applicable to the network interface unit; and establishing, at a cable network device that services the network interface unit, one or more quality of service configuration parameter values that are associated with the quality of service, based on the quality of service provisioning code value.

2. A method as recited in claim 1, further comprising the steps of:

receiving a DHCP Discover packet from the network interface unit;

determining whether the network interface unit conforms to DOCSIS protocol or DVB/DAVIC protocol;

inserting an Option 82 field into the DHCP Discover packet, wherein the Option 82 field includes first information identifying whether the network interface unit conforms to DOCSIS protocol or DVB/DAVIC protocol.

3. A method as recited in claim 2, wherein the step of receiving a DHCP message further comprises the steps of receiving a DHCP message that includes the network address and a quality of service code value within an option field of the message, wherein the quality of service code value is associated with a quality of service that is applicable to the network interface unit, wherein the quality of service code value is determined by retrieving, from a data store, a mapping of a network interface identifier to a quality of service name, based on a network interface identifier that is uniquely associated with the network interface unit, and wherein retrieving the mapping is carried out by executing a script in response to receiving the DHCP Discover packet.

4. A method as recited in claim 1, wherein the step of receiving a request to obtain a network address comprises the steps of:

receiving a DHCP Discover packet from the network interface unit;

determining whether the network interface unit conforms to DOCSIS protocol or DVB/DAVIC protocol;

modifying the DHCP Discover packet by inserting an Option 82 field into the DHCP Discover packet, wherein the Option 82 field includes information identifying whether the network interface unit conforms to DOCSIS protocol or DVB/DAVIC protocol; and sending the modified DHCP Discover packet to a subscriber registration center to obtain a quality of service associated with the network interface unit.

5. A method as recited in claim 1, wherein the step of receiving a DHCP message further comprises the steps of receiving a DHCP message that includes the network address and a quality of service code value within an option field of the message, wherein the quality of service code value is associated with a quality of service that is applicable to the network interface unit, wherein the quality of service code value is determined by retrieving, from a data store, a mapping of a network interface identifier to a quality of service name, based on a network interface identifier that is uniquely associated with the network interface unit.

6. A method as recited in claim 1, wherein receiving a DHCP message that includes the network address and a quality of service code value comprises receiving a DHCP message that includes the quality of service code within a remote identifier sub-option field of an Option 82 field of the message.

7. A method as recited in claim 1, further comprising the steps of receiving a DHCP Offer packet that contains a quality of service code value in Option 82 of the DHCP Offer packet.

8. A method as recited in claim 1, wherein establishing one or more quality of service configuration parameter values that are associated with the quality of service comprises the steps of creating and storing an entry in a quality of service table that references the network interface unit and identifies a quality of service associated with the network interface unit.

9. A method as recited in claim 8, further comprising periodically deleting each entry in the quality of service table that references a network interface unit that is no longer participating in the network.

10. A method as recited in claim 1, wherein the receiving and establishing steps are carried out by an interactive network adapter.

11. A method as recited in claim 1, wherein the receiving and establishing steps are carried out by a universal broadband router.

12. A method of establishing a quality of service configuration in a network device that participates in a broadband cable network, the method comprising the computer-implemented steps of:

receiving a DHCP Discover request to obtain a network address from a network interface unit over the cable network;

modifying the Discover request by inserting an option field that can carry a quality of service code value into the Discover request;

forwarding the modified Discover request to a DHCP server for obtaining the network address;

receiving a DHCP Offer message that includes the network address and the quality of service code value within an option field of the Offer message, wherein the quality of service code value is associated with a quality of service that is applicable to the network interface unit, wherein the quality of service code value is determined by retrieving a mapping of a unique identifier of the network interface unit to a quality of service name from a data store, and mapping the quality of service name to the quality of service code value; and configuring a cable network device that services the network interface unit with one or more quality of service configuration parameter values that are associated with the quality of service name, based on the quality of service provisioning code value;

modifying the Offer message by removing the option field;

forwarding the modified Offer message to the network interface unit.

13. A computer-readable medium carrying one or more sequences of instructions for establishing a quality of service configuration in a network device that participates in a broadband cable network, which instructions, when executed by one or more processors, cause the one or more processors to carry out the steps of:

receiving a request to obtain a network address from a network interface unit over the cable network;

receiving a Dynamic Host Configuration Protocol (DHCP) message that includes the network address and a quality of service code value within an option field of the message, wherein the quality of service code value is associated with a quality of service that is applicable to the network interface unit; and establishing, at a cable network device that services the network interface unit, one or more quality of service configuration parameter values that are associated with the quality of service, based on the quality of service provisioning code value.

14. A computer-readable medium as recited in claim 13, further comprising instructions which, when executed by the one or more processors, cause the one or more processors to carry out the steps of:

receiving a DHCP Discover packet from the network interface unit;

determining whether the network interface unit conforms to DOCSIS protocol or DVB/DAVIC protocol;

inserting an Option 82 field into the DHCP Discover packet, wherein the Option 82 field includes information identifying whether the network interface unit conforms to DOCSIS protocol or DVB/DAVIC protocol.

15. A computer-readable medium as recited in claim 13, wherein the step of creating and storing first information further comprises instructions which, when executed by the one or more processors, cause the one or more processors to carry out the steps of:

receiving a DHCP Discover packet from the network interface unit;

determining whether the network interface unit conforms to DOCSIS protocol or DVB/DAVIC protocol;

modifying the DHCP Discover packet by inserting an Option 82 field into the DHCP Discover packet, wherein the Option 82 field includes information identifying whether the network interface unit conforms to DOCSIS protocol or DVB/DAVIC protocol; and sending the modified DHCP Discover packet to a subscriber registration center to obtain a quality of service associated with the network interface unit.

16. A computer-readable medium as recited in claim 13, wherein the step of creating and storing second information further comprises instructions which, when executed by the one or more processors, cause the one or more processors to carry out the steps of receiving a DHCP message that includes the network address and a quality of service code value within an option field of the message, wherein the quality of service code value is associated with a quality of service that is applicable to the network interface unit, wherein the quality of service code value is determined by retrieving, from a data store, a mapping of a network interface identifier to a quality of service name, based on a network interface identifier that is uniquely associated with the network interface unit.

17. A computer-readable medium as recited in claim 13, wherein the step of creating and storing second information further comprises instructions which, when executed by the one or more processors, cause the one or more processors to carry out the steps of receiving a DHCP message that includes the network address and a quality of service code value within an option field of the message, wherein the quality of service code value is associated with a quality of service that is applicable to the network interface unit, wherein the quality of service code value is determined by retrieving, from a data store, a mapping of a network interface identifier to a quality of service name, based on a network interface identifier that is uniquely associated with the network interface unit, and wherein retrieving the mapping is carried out by executing a script in response to receiving the DHCP Discover packet.

18. A computer-readable medium as recited in claim 13, wherein the instructions for carrying out the step of receiving a DHCP message that includes the network address and a quality of service code value further comprise instructions for carrying out the steps of receiving a DHCP message that includes the quality of service code within a remote identifier sub-option field of an Option 82 field of the message.

19. An apparatus for establishing a quality of service configuration in a network device that participates in a broadband cable network, which instructions, comprising:

means for receiving a request to obtain a network address from a network interface unit over the cable network;

means for receiving a Dynamic Host Configuration Protocol (DHCP) message that includes the network address and a quality of service code value within an option field of the message, wherein the quality of service code value is associated with a quality of service that is applicable to the network interface unit; and means for establishing, at a cable network device that services the network interface unit, one or more quality of service configuration parameter values that are associated with the quality of service, based on the quality of service provisioning code value.

20. An apparatus for establishing a quality of service configuration in a network device that participates in a broadband cable network, which instructions, comprising:

a network interface that is coupled to the data network for receiving one or more packet flows therefrom;

a processor;

one or more stored sequences of instructions which, when executed by the processor, cause the processor to carry out the steps of:

receiving a request to obtain a network address from a network interface unit over the cable network;

receiving a Dynamic Host Configuration Protocol (DHCP) message that includes the network address and a quality of service code value within an option field of the message, wherein the quality of service code value is associated with a quality of service that is applicable to the network interface unit; and establishing, at a cable network device that services the network interface unit, one or more quality of service configuration parameter values that are associated with the quality of service, based on the quality of service provisioning code value.

* * * * *